United States Patent [19]

Tacheny et al.

[11] Patent Number: 4,521,993
[45] Date of Patent: Jun. 11, 1985

[54] CHAIN OPERATOR FOR A WINDOW

[75] Inventors: John C. Tacheny, Owatonna; Anthony C. Schema, Faribault, both of Minn.

[73] Assignee: Truth Incorporated, Owatonna, Minn.

[21] Appl. No.: 521,043

[22] Filed: Aug. 8, 1983

[51] Int. Cl.³ .............................................. E05F 11/00
[52] U.S. Cl. .................................. 49/325; 74/606 R; 74/89.2
[58] Field of Search ................... 49/325, 324; 74/606, 74/89.2

[56] References Cited

U.S. PATENT DOCUMENTS

| | | |
|---|---|---|
| 1,260,550 | 3/1918 | Kopp . |
| 1,333,595 | 3/1920 | Anderson . |
| 1,584,198 | 5/1926 | Stevens . |
| 1,870,244 | 8/1932 | Elston . |
| 2,017,543 | 10/1935 | Madsen . |
| 2,045,261 | 6/1936 | Clute .................................... 254/95 |
| 2,131,261 | 9/1938 | Aldeen et al. ..................... 49/325 X |
| 2,140,842 | 12/1938 | Madsen ................................. 74/548 |
| 2,454,794 | 11/1948 | Hakanson ............................ 292/264 |
| 2,832,590 | 4/1958 | Youngberg . |
| 3,090,613 | 5/1963 | Bechtold . |
| 3,234,698 | 2/1966 | Kimblern ............................... 52/108 |
| 3,610,055 | 10/1971 | Parris ............................... 74/606 X |
| 3,911,802 | 10/1975 | Morden ................................ 98/2.14 |
| 4,014,136 | 3/1977 | Hemens et al. ....................... 49/325 |
| 4,382,349 | 5/1983 | Dunphy et al. ....................... 49/325 |

FOREIGN PATENT DOCUMENTS 1091528 11/1967 United Kingdom ................. 49/325

Primary Examiner—Kenneth Downey
Attorney, Agent, or Firm—Wood, Dalton, Phillips, Mason & Rowe

[57] ABSTRACT

A chain operator for a window, and particularly a skylight window, having a casing with a chain storage area from which a chain can be advanced for opening of the window. The casing is constructed for mounting of different types of drive mechanism for a chain drive sprocket within the casing. A unitary liner is fitted within the casing to provide a reduced friction mounting for the drive sprocket and a reduced friction guide for the chain, with the liner being positioned in high load and high wear areas to result in smooth and quiet long-life operation. The chain operator has a chain composed of solid links pivotally interconnected by U-shaped links and interrelated in a manner to readily move between straight and curved configurations and operate under relatively heavy load.

20 Claims, 12 Drawing Figures

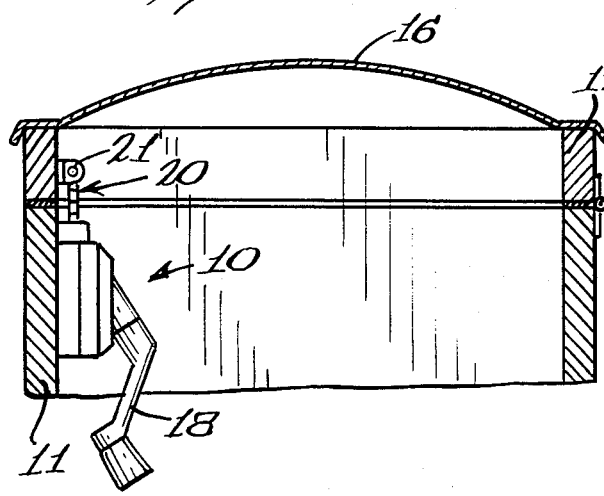
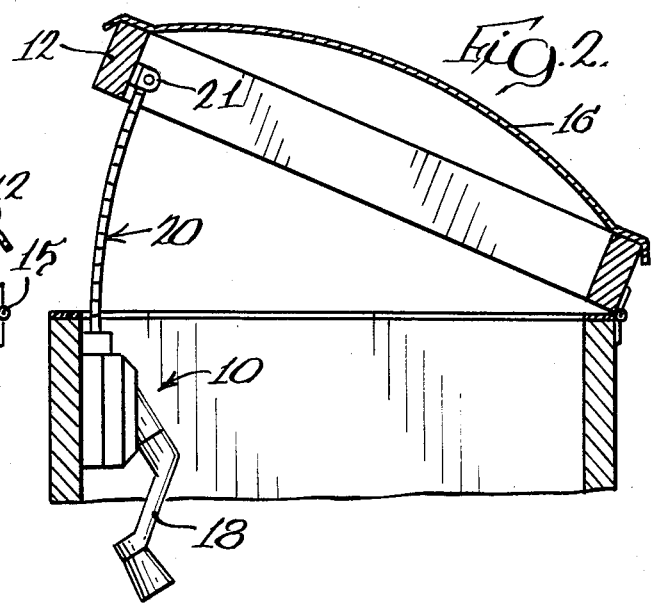
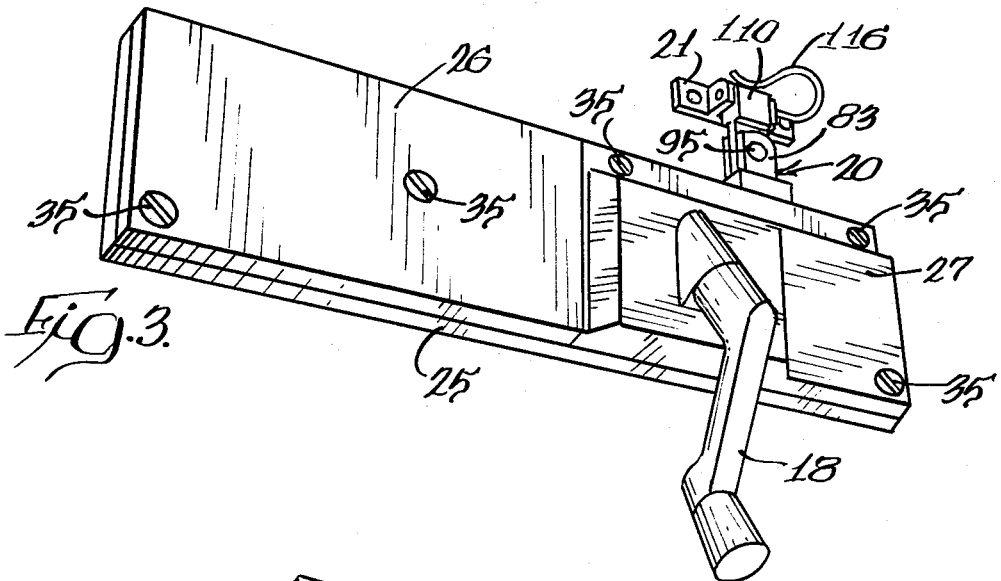
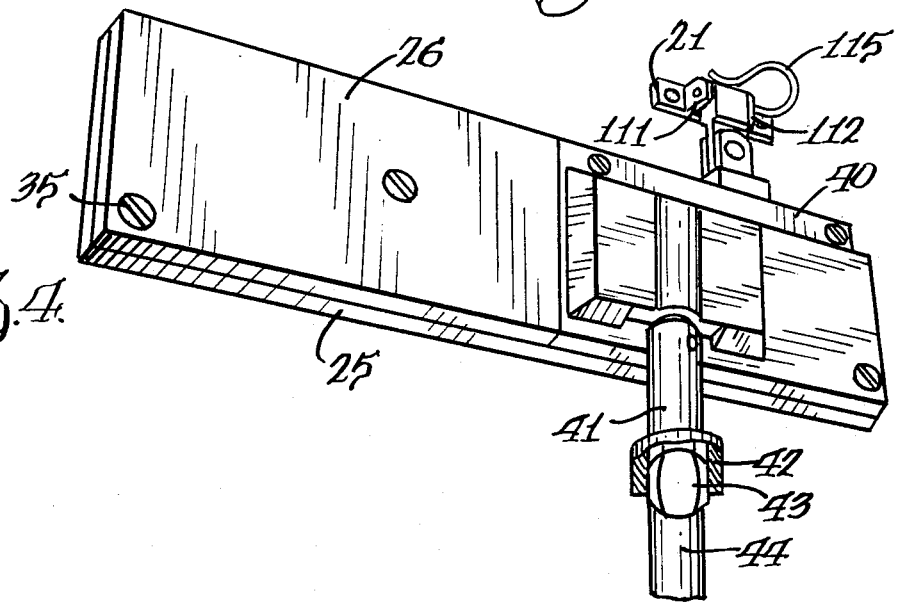

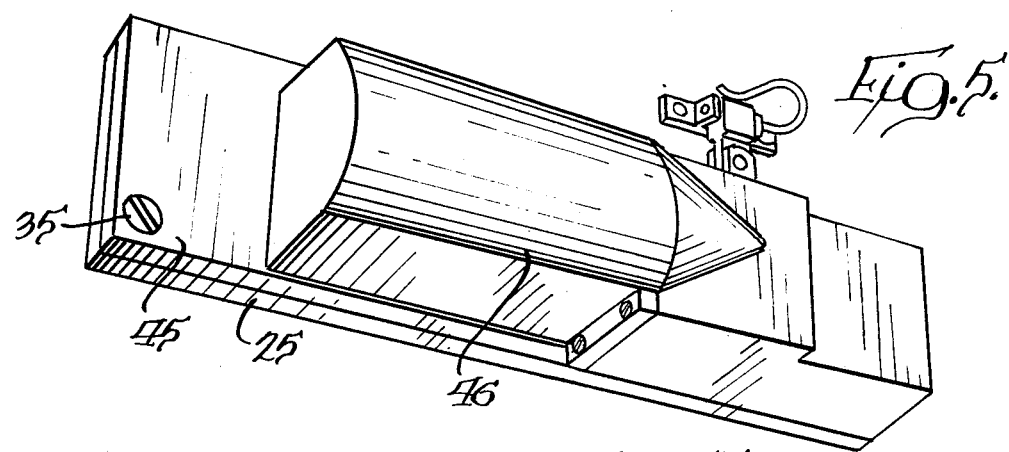
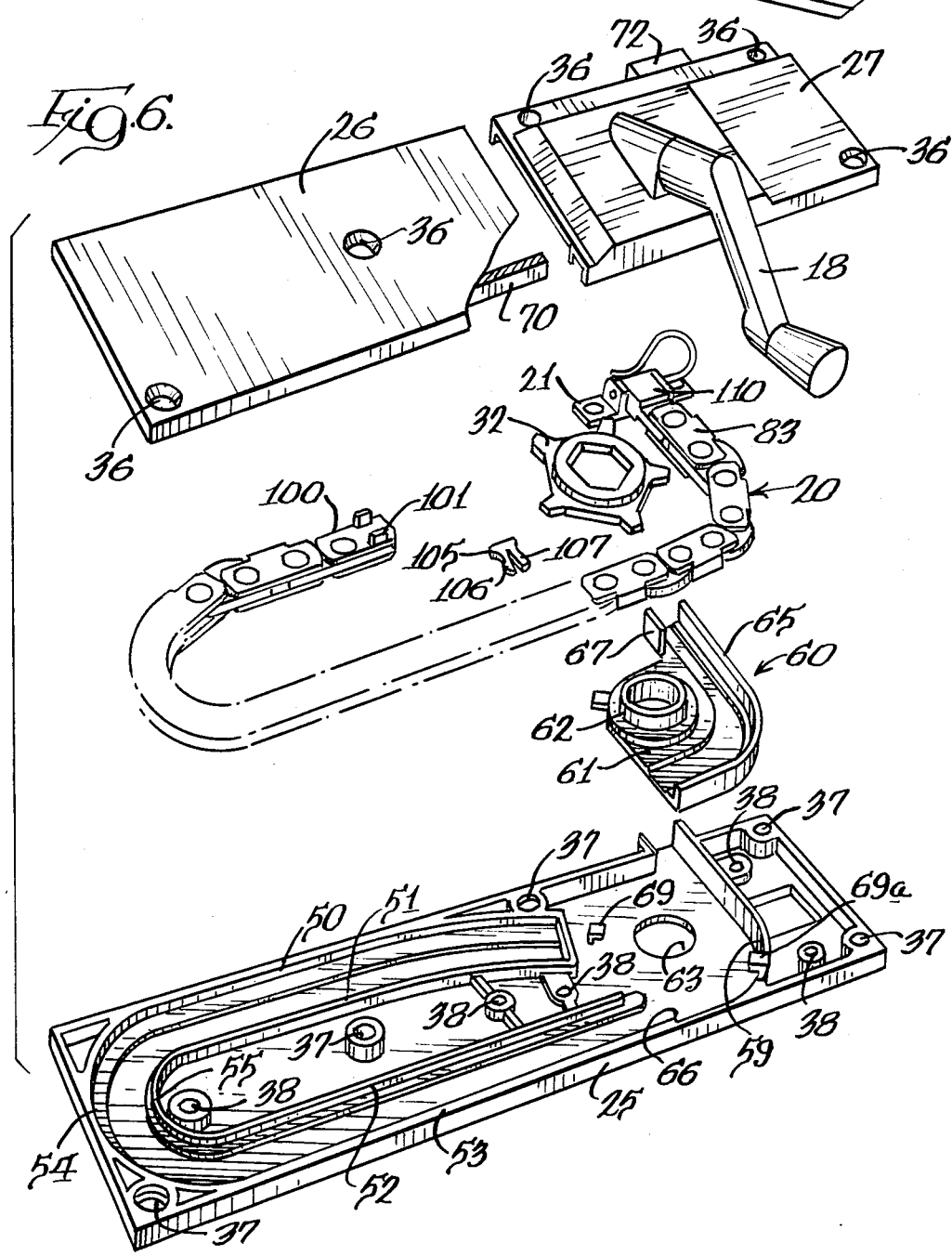

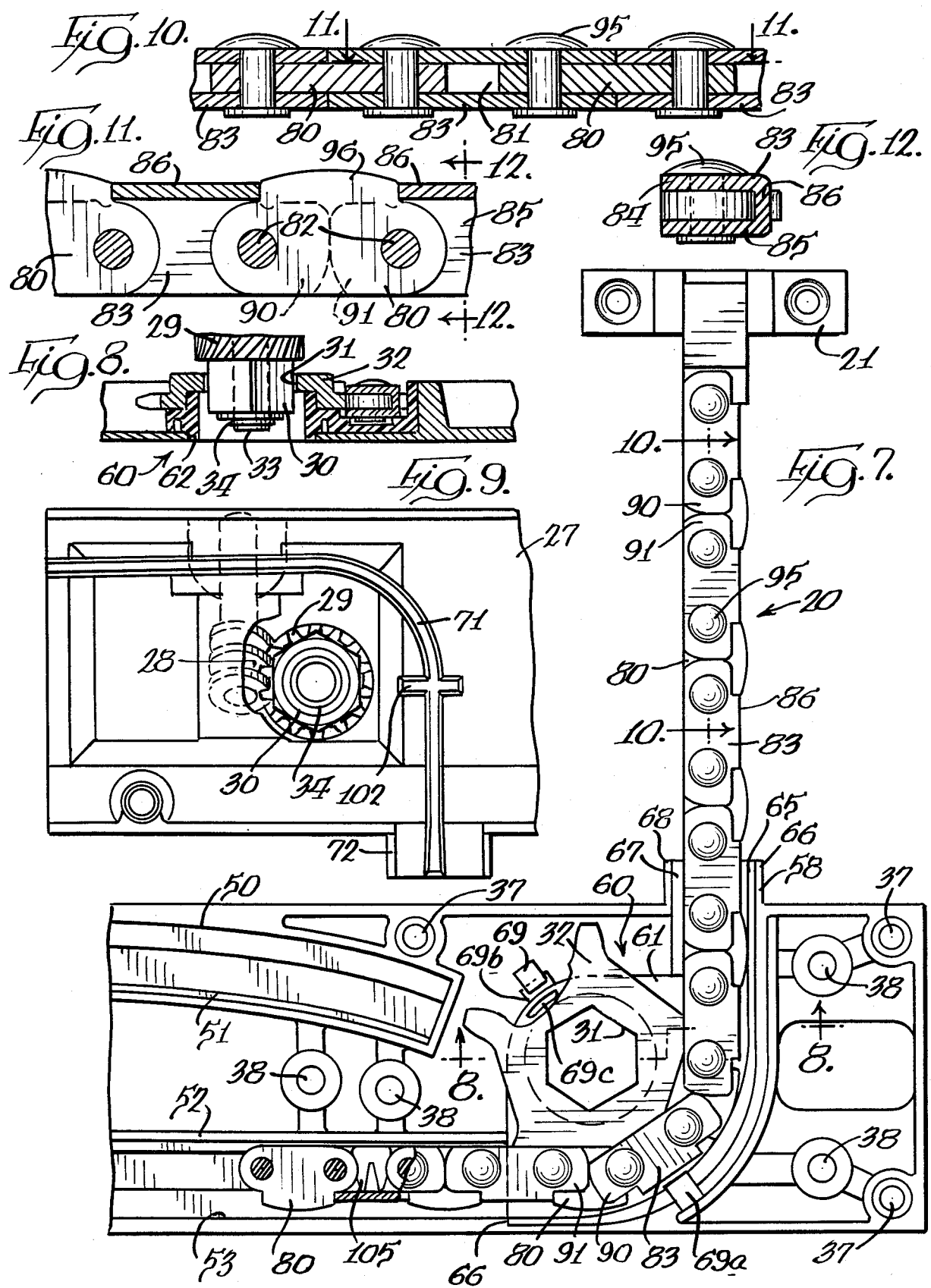

CHAIN OPERATOR FOR A WINDOW

BACKGROUND OF THE INVENTION

This invention pertains to a new and improved chain operator for a window, such as a skylight window, wherein a chain which can assume a curved configuration while in storage within a casing of the chain operator can assume a straight configuration and move outwardly from the casing to open the window.

Chain operators for windows are known in the art wherein a length of chain may be stored within a casing for the operator and rotation of a drive sprocket within the casing causes movement of the chain either into or out of the casing for positioning of a window connected to an exposed end of the chain. The prior art chain operators have had constructions which were limited in the load that could be handled in moving a window. The limitations of the prior art operators have resulted from a number of inadequacies in the structure, including mounting of the drive sprocket, the guide structure for the chain, and the construction of the chain.

There can be many different requirements for mounting of the chain operator as well as actuating means therefor. The prior art has not included structures which could be mounted in a variety of different ways and easily be modified to be operated by either a handle, a pole crank, or a motor.

SUMMARY OF THE INVENTION

A primary feature of the invention is to provide a chain operator for a window, such as a skylight window, having increased lifting power and several different options for mounting and operation, which operates more smoothly and which has means for readily detaching the operator from the window to facilitate quick and/or wider opening of the window for egress therethrough.

More particularly, an object of the invention is to provide a chain operator having a casing with a chain storage area with the chain being moved relative to the casing by a power input including a drive sprocket engageable with the chain and a unitary liner fitted in the casing and having a first part for rotatably mounting the drive sprocket and a second part lining the curved portion of the guidetrack opposite said drive sprocket to facilitate movement of the chain relative to the casing and provide a bearing surface in the area of high loads and high wear between the chain and the liner and high loads between the sprocket and the liner.

In carrying out the foregoing, the liner is of a one-piece unitary structure which is shaped to coact with parts of the casing to lock the liner in position.

Another object of the invention is to provide a chain operator for a window, such as a skylight window, wherein the casing has a base and a two-part cover, each cover part having a depending hold-down rib overlying a chain storage area within the base of the casing for guiding the chain in movement in and out of the casing and one part of the cover being replaceable and being constructed either with a motor mounted thereon for operating a drive sprocket within the casing, a handle for manually operating the drive sprocket, or an adapter having an opening to receive a connecting structure carried at the end of a pole crank.

A further object of the invention is to provide a chain operator wherein the chain has a length sufficient to provide substantial opening of a window and means in the form of a removable insert is positionable in a selected tooth-engaging space of the chain to preclude entry of a drive sprocket tooth into said space and reduce the length of chain which can be extended from the casing for lesser window opening.

Still another object of the invention is to provide a chain operator wherein a free end of the chain has a sash bracket attachable to the sash of a window and the sash bracket is connected to the chain by quick release means for releasably connecting the sash bracket to the end of the chain.

A further object of the invention is to provide a chain operator for a window having a chain constructed of a plurality of solid links and plurality of U-shaped links, with the U-shaped links being positioned in end-to-end abutting relation and the solid links having a thickness to closely fit within the U-shaped links, with the links being constructed to provide substantial rigidity for the chain when it is in straight configuration for transmitting force to the window for opening and closing thereof and with the links having coacting shapes to facilitate movement of the chain between straight and curved configurations while maximizing the strength thereof and rivets with large heads pivotally interconnecting the opposite ends of a solid link to a pair of U-shaped links for increased strength.

BRIEF DESCRIPTION OF THE DRAWINGS

FIG. 1 is a central sectional view of a skylight window showing the chain operator mounted to the window with the window in closed position;

FIG. 2 is a view, similar to FIG. 1, showing the window in open position;

FIG. 3 is a perspective view of the chain operator with the cover part having the handle operator;

FIG. 4 is a view, similar to FIG. 3, of the chain operator showing a cover part having structure for association with a pole crank for remote operation;

FIG. 5 is a view of the chain operator, similar to FIG. 3, showing a cover part having a motor drive;

FIG. 6 is an exploded perspective view of the structure of the chain operator in the embodiment of FIG. 3;

FIG. 7 is a fragmentary plan view of the chain operator with the cover and drive mechanism carried therewith removed and with the chain shown substantially extended from the casing;

FIG. 8 is a fragmentary section, taken generally along the line 8—8 in FIG. 7 and with part of the drive mechanism shown associated with the drive sprocket;

FIG. 9 is a fragmentary bottom plan view of a portion of the cover of the casing;

FIG. 10 is a fragmentary sectional view of the chain taken generally along the line 10—10 in FIG. 7;

FIG. 11 is a sectional view, taken generally along the line 11—11 in FIG. 10; and FIG. 12 is a sectional view, taken generally along the line 12—12 in FIG. 11 and turned through 90°.

DESCRIPTION OF THE PREFERRED EMBODIMENTS

The chain operator, indicated generally at 10 in FIGS. 1 and 2, is shown mounted for operation of a window and particularly a skylight window having a frame 11 and a sash 12 hinged to the frame at 15. The sash has a dome member 16 which transmits light.

The chain operator, in the embodiment shown in FIGS. 1 and 2, has a rotatable handle 18 extended from a casing. The handle, when rotated, moves a chain, indicated generally at 20, from a retracted position shown in FIG. 1 to an extended window-open position, shown in FIG. 2. The chain is connected to the window sash 12 by a sash bracket 21, more particularly described hereinafter.

A number of primary components of the chain operator are shown in the exploded view of FIG. 6, with the operator having a casing with a base 25 and a two-part cover having the cover parts 26 and 27. The cover part 27 mounts the handle 18 for rotation and, as known in the art, the handle 18 is fixed to a worm shaft 28 having a worm which engages with a helix gear 29 (FIG. 9) which is integral with an hexagonal driving member 30 engageable within an hexagonal opening 31 in a drive sprocket 32. The helix gear 29 and hexagonal driving member 30 are rotatably mounted on an integral shaft 33 extending from the underside of the casing part 27 and held on the shaft by a stud receiver 34. The worm shaft 28 extends outwardly from the cover part 27 at an angle to provide an angled mounting as shown in FIGS. 1 and 2 whereby the handle 18 may be easily grasped and rotated.

The structure of FIG. 6 is shown in assembled relation in FIG. 3, with the casing components held in assembled relation by flat head, self-tapping screws 35 which extend through openings 36 in the cover parts 26 and 27 and thread into openings 37 in the cover base 25. The chain operator casing can be mounted to the window frame in different ways. The base 25 has openings 38 through which screws can be passed when the cover parts 26 and 27 are removed and the screws threaded into the window frame and, thereafter, the cover parts attached to the base 25, through use of the screws 35. This enables removal of the cover parts without removing the cover base from the window frame. A second form of mounting is to use longer screws in place of the screws 35 which pass through the cover part openings 36 and the base openings 37 and thread into the window frame whereby these screws hold the casing together and also mount the casing to the window frame. A third form of mounting to the window frame is by utilizing the base openings 38 with the use of self-tapping screws which extend through the window frame and thread into the openings 38 by entering such openings from the bottom of the base 25.

FIGS. 4 and 5 illustrate alternate embodiments of the chain operator wherein the structure differs only in the construction of the cover part 27 and the actuating mechanism associated therewith. In FIG. 4, a cover part 40 is used in place of the cover part 27 and has a drive adapter 41 fixed to a worm shaft similar, to that previously described, but which is not extended at an angle, for driving the drive sprocket 32. The adapter 41 has an enlarged end 42 with a hexagonal recess therein to receive a hex ball 43 at the end of a pole crank 44. The pole crank 44 can be manually operated at a distance from the chain operator and with the hex ball drive connection, the adapter 41 can be rotated to actuate the chain operator. A conventional hook drive can be provided.

Another embodiment is shown in FIG. 5 wherein a cover part 45 mounts an electric motor 46 which, through gearing (not shown), can rotate the helix gear 29, driving member 30 and drive sprocket 32. Also, a motor mounted at the rear of the base 25 can be used in a manner to be described.

From the foregoing, it will be seen that the chain operator can have several different optional drives utilizing the same basic structure, with only a portion of the cover being different in each instance to provide the particular drive that is desired.

The chain operator casing has a chain storage area provided predominantly between the base 25 and the cover part 26. The chain storage area is defined by a chain guide track formed in the base 25. In a commercial embodiment, the casing base 25 as well as the cover parts 26 and 27, 40, 45 are cast of a metal, such as zinc, and the chain guide track is formed by elements cast integrally with the case 25. The chain guide track formed in the base 25 is generally U-shaped, with one leg of the U being formed by spaced-apart walls 50 and 51 and the other leg being formed by spaced-apart walls 52 and 53 and with a curved connecting part of the chain guide track being defined by spaced-apart curved walls 54 and 55. With the generally U-shaped guide track, a substantial length of chain can be stored within the casing and thereby when extended from the casing can provide for a relatively wide opening of the window.

As the chain 20 leaves the chain storage area, it moves along a curved path leading to a chain exit 58. The curved path is defined by a curved wall 59 of the base 25 and the chain is in driving engagement with the drive sprocket 32 whereby, as the drive sprocket rotates, the chain is caused to either move outwardly from the casing or return into the casing and into the chain storage area.

An important feature of the construction is the use of a unitary liner, indicated generally at 60 in FIG. 6, formed of DELRIN AF fiber resin manufactured by DuPont and which is a combination of acetyl resin and Teflon. This liner provides bearing surfaces and is positioned where high load and high wear occurs and being a relatively smooth bearing material allows smooth and quiet movement of the chain 20 by rotation of the drive sprocket 32. The liner 60 is shown particularly in FIGS. 6, 7 and 8. The liner has a first part 61 with a planar base and a cylindrical section 62 extending both above and below the planar base. The upper part of the cylindrical section 62 provides a rotatable mounting for the drive sprocket 32, as shown in FIG. 8, with the drive sprocket having an offset to fit onto the upper part of the cylindrical section. The lower part of the cylindrical section fits within an opening 63 in the base 25 for assistance in locating the liner. A second part of the unitary liner 60 has a first flange 65 shaped to coincide with the curved wall 59 of the casing base and extend from a locating notch 66 to an outer position coextensive with a protruding flange 66 of the casing at the chain exit 58. A second flange 67 of the liner abuts an extension 68 of the casing at the chain exit. The base 25 has two upstanding hooks 69 and 69a for hold-down of the liner. The hook 69a fits over the first flange 65 of the liner. The first part 61 of the liner has an outwardly-extending tab 69b which is positioned under the hook 69. An opening 69c in said first part of the liner provides flexibility to permit compression of the liner first part to enable the tab 69b to move to a position under the hook 69.

With the location of the cylindrical section of the liner in the base opening 63 and the engagement of an end of the flange 65 with the notch 66 in the casing as well as the location of the flanges 65 and 67 inwardly of the casing flanges 66 and 68, the liner is fixed in position within the casing base. The liner is effective at areas of high loads between the sprocket and the base as well as between the chain and the casing as it passes through the curved section in engagement with the drive sprocket which are also areas of high wear. The bearing action of the liner facilitates the smooth operation of the chain operator and prolongs the useful life thereof.

The rear drive motor has a hex connection extended into base opening 63 and the opening in the cylindrical section 62 of the liner to engage the hexagonal driving member 30.

The cover part 26 and the cover part 27 each have a depending rib functioning as a chain hold-down rib. As seen in the broken-away part of cover part 26 in FIG. 6, there is a rib 70 formed on the underside thereof having the same U-shaped contour as the chain guide track in the base 25 and which overlies a central part thereof to loosely hold the chain in the chain storage area. As seen in FIG. 9, the cover part 27 has a rib 71, shaped to form a continuation of the rib 70 on the underside of the cover part 26 and having a curvature to overlie the curved path of the chain as it passes about the drive sprocket 32. This rib extends outwardly and beneath an extension 72 of the cover part which overlies the chain exit 58.

The chain 20 used in the chain operator is seen particularly in FIGS. 6 to 8 and 10 to 12. The chain is composed of a series of solid links 80 of case hardened material which are in spaced-apart, end-to-end relation to provide a sprocket tooth-receiving space 81 therebetween. Each of the solid links has a pair of rivet-receiving openings 82. A series of U-shaped links 83 alternate with the solid links 80, with each of the U-shaped links having a central part with a pair of spaced-apart side walls 84 and 85 interconnected by a bridging section 86, with the side walls and bridging section positioned to span three sides of a sprocket tooth-receiving space 81. The side walls 84 and 85 of a U-shaped link 83 have parts extending beyond the bridging section 86 to lie closely adjacent a solid link 80 positioned therebetween and with the side wall parts of adjacent U-shaped links 83 completely overlapping a solid link 80. This relation is seen particularly in FIGS. 7 and 11 wherein, in FIG. 11, a pair of adjacent bridging sections 86 are spaced from each other and side wall parts, shown in broken line at 90 and 91, extend beyond the bridging sections 86 to completely overlap the solid link 80. The ends of the side wall parts 90 and 91 are in substantially abutting relation and have parts thereof curved to permit non-interfering movement therebetween as the chain moves between a curved configuration and a straight configuration.

A plurality of large head rivets 95 extend through the side wall parts 90 and 91 and the rivet-receiving openings 82 to pivotally interconnect the solid links 80 and the U-shaped links 83. Each of the solid links 80 has a raised part 96 providing, at its end, a pair of shoulders against which the ends of bridging sections 86 of adjacent U-shaped links 83 may abut when the chain is in a straight configuration to prevent movement of the chain past such straight configuration. This chain construction provides for lifting of a skylight window of substantial weight. The solid links 80 are case hardened for long wear because of their driving relation with the drive sprocket 32. With the close fitting of the U-shaped links 83 on the solid links 80 and the complete overlap thereof, there is substantial strength imparted to the links which is further enhanced by the large head rivets 95.

An inner end of the chain has a stop member 100 with an upstanding flange 101 which can engage a projection 102 (FIG. 9) extending laterally from the depending ribs 71 to limit the movement of the chain out of the casing. This provides for a maximum length of chain outside the casing. If it is desired to limit the length of chain exposed from the casing to less than the maximum, a plastic removable insert 105 (FIGS. 6 and 7) can be inserted in a sprocket tooth-driving space 81 to preclude a sprocket tooth entering the space. As seen in FIG. 7, the insert 105 is positioned in a sprocket tooth-receiving space and is held in that position by a pair of the rivets 95. This insert can be positioned in any sprocket tooth-driving space along the length of the chain which is normally positioned within the casing when the chain is retracted.

The sash bracket 21 is pivotally carried at the end of the chain and, as previously mentioned, attaches to the window sash as shown in FIGS. 1 and 2. The structure which attaches the sash bracket 21 to the chain includes a sash link 110 pivotally connected to the end U-shaped link 83 by a rivet 95 and having a transverse opening which aligns with openings in a pair of ears 111 and 112 upstanding from the sash bracket. These aligned openings receive a removable sash pin 115 which is generally U-shaped to have one leg thereof pass through the openings and another leg 116 formed as a spring member which can engage between the sash bracket ears 111 and 112 and retain the sash pin in position. This is a yieldable retention whereby the sash pin can be removed to detach the sash bracket from the chain whereby the window sash can be opened a greater distance than that accomplished by operation of the chain operator when it is desired to have egress through the window.

From the foregoing, it will be evident that the chain operator disclosed herein is a distinct improvement over the prior art. These improvements include the chain construction for handling increased window loading and the design of other components which provide for improved operation and a longer useful life.

We claim:

1. A chain operator for a window comprising, a casing having a chain storage area including a chain guide track having a curved portion extending to a chain exit from the casing, a drive sprocket in said casing engageable with said chain, drive means connected to said sprocket for converting a power input into rotation of said drive sprocket and a unitary liner fitted in said casing and having a first part for rotatably mounting the drive sprocket and a second part lining the curved portion of the guide track opposite said drive sprocket.

2. A chain operator as defined in claim 1 wherein said liner is of molded plastic.

3. A chain operator as defined in claim 1 wherein said first part of the liner has a cylindrical section extending beyond opposite sides of a generally planar base, an opening in a wall of the casing to receive one end of the cylindrical section, and said drive sprocket being rotatable on the other end of the cylindrical section.

4. A chain operator as defined in claim 3 wherein said second part of the liner has a curved flange raised up from said generally planar base with an end positioned in said chain exit, and a second flange spaced from said first flange end and positioned in said chain exit, and a pair of spaced-apart flanges extending from the casing at the chain exit and which interfit with the liner flanges.

5. A chain operator as defined in claim 1 wherein said casing has a base and a cover, said chain guide track being formed in said base, and a chain hold-down rib formed on the underside of the cover and overlying the guide track.

6. A chain operator for a window comprising, a chain, a casing having an internal chain storage area, said casing including a base and a two-part cover, said base having a chain guide track terminating in a chain exit, a drive sprocket rotatably mounted on said base and engageable with said chain, one part of said cover overlying the chain storage area of the casing, the other part of the cover overlying the drive sprocket and the chain exit and having drive means engageable with the drive sprocket.

7. A chain operator as defined in claim 6 wherein said drive means includes a motor mounted on said other part of the cover.

8. A chain operator as defined in claim 6 wherein said drive means includes a handle rotatably mounted on said other part of the cover.

9. A chain operator as defined in claim 6 wherein said drive means includes a shaft having an opening to receive a hex ball mounted at the end of a pole crank.

10. A chain operator as defined in claim 6 wherein each part of the cover has a depending rib overlying the chain guide track to confine the chain for movement along the chain guide track.

11. A chain operator as defined in claim 6 including means selectively positionable along the length of the chain to limit the length of chain which may extend out of the casing.

12. A chain operator as defined in claim 11 wherein said chain is a link chain with successive spaces for receiving a tooth of the drive sprocket and said selectively positionable means is an insert positionable in a chain space to preclude entry of a drive sprocket tooth into the chain space.

13. A chain operator for a window comprising, a casing having a chain storage area including a chain guide track having a curved portion extending to a chain exit from the casing, a drive sprocket in said casing engageable with said chain, drive means connected to said sprocket for converting a power input into rotation of said drive sprocket, a chain mounted in said casing with an end positioned outside the chain exit from the casing, a sash bracket carried by said end of the chain and having a pair of spaced ears with aligned openings, and quick release means releasably connecting the sash bracket to said end of the chain including a removable U-shaped sash pin having a leg passing through said aligned openings.

14. A chain operator for a window having a casing from which a chain is extendable for positioning a window, said chain comprising a plurality of solid links and a plurality of U-shaped links, said U-shaped links being positioned in end-to-end abutting relation, said solid links having a thickness to closely fit within the U-shaped links, and rivets with large heads pivotally interconnecting the opposite ends of a solid link to a pair of U-shaped links.

15. A chain operator as defined in claim 14 wherein said U-shaped links have their ends shaped to permit non-interfering movement therebetween as the chain moves between straight and curved configurations.

16. A chain operator for a window utilizing a chain which is movable between a straight rigid motiontransmitting configuration and a curved configuration comprising, a series of solid links in spaced end-to-end relation to provide a sprocket tooth-receiving space therebetween, each of said solid links having a pair of openings adjacent their ends, a series of U-shaped links alternating with said solid links, each of said U-shaped links having a central part with a pair of spaced-apart side walls and a bridging section positioned to span three sides of an aforementioned sprocket tooth-receiving space, said link side walls having parts extending beyond said bridging section to lie closely adjacent a solid link therebetween and with the side wall parts of adjacent U-shaped links completely overlapping a solid link, said ends of the side wall parts being in substantially abutting relation, and a plurality of members extending through the side wall parts and the openings to pivotally interconnect the links, each of said solid links having a part positioned to abut the ends of a pair of bridging sections of adjacent U-shaped links when the chain is in the straight configuration to prevent movement of the chain past said straight configuration.

17. A chain operator for a window utilizing a chain which is movable between a straight rigid motiontransmitting configuration and a curved configuration comprising, a series of solid links in spaced end-to-end relation to provide a sprocket tooth-receiving space therebetween, each of said solid links having a pair of rivet-receiving openings adjacent their ends, a series of U-shaped links alternating with said solid links, each of said U-shaped links having a central part with a pair of spaced-apart side walls and a bridging section positioned to span three sides of an aforementioned sprocket tooth-receiving space, said link side walls having parts extending beyond said bridging section to lie closely adjacent a sold link therebetween and with the side wall parts of adjacent U-shaped links completely overlapping a solid link, said ends of the side wall parts being in substantially abutting relation and being at least partially curved to permit non-interfering movement therebetween as the chain moves between said two configurations, a plurality of large head rivets extending through the side wall parts and the rivet-receiving openings to pivotally interconnect the links, each of said solid links having a part positioned to abut the ends of a pair of bridging sections of adjacent U-shaped links when the chain is in the straight configuration to prevent movement of the chain past said straight configuration, and the ends of the solid links having a curvature formed as an arc of a circle with its center coincident with the center of the rivet opening at said end whereby an end of a bridging section can freely move relative to a solid link as the chain moves between said configurations.

18. A chain operator as defined in claim 17 wherein said solid links are case hardened.

19. A chain operator as defined in claim 1 wherein said casing has a pair of hooks for holding said liner in position in said casing.

20. A chain operator as defined in claim 4 wherein said casing has a pair of hooks with one hook overlying said curved flange of the liner, a compressible tab extending from the periphery of the planar base of the liner and positioned under the other of said hooks.

* * * * *